United States Patent
Tsuchiya (10) Patent No.: US 8,243,145 B2
(45) Date of Patent: Aug. 14, 2012

(54) INFORMATION PROCESSING TERMINAL AND TERMINAL SELECTION SYSTEM

(75) Inventor: Hitoshi Tsuchiya, Hamura (JP)

(73) Assignee: Olympus Corporation, Tokyo (JP)

( * ) Notice: Subject to any disclaimer, the term of this patent is extended or adjusted under 35 U.S.C. 154(b) by 823 days.

(21) Appl. No.: 12/396,884

(22) Filed: Mar. 3, 2009

(65) Prior Publication Data

US 2009/0225172 A1   Sep. 10, 2009

(30) Foreign Application Priority Data

Mar. 4, 2008   (JP) .................................. 2008-053695

(51) Int. Cl.
    H04N 5/225   (2006.01)
(52) U.S. Cl. ................. 348/207.1; 348/211.4
(58) Field of Classification Search ............ 348/207.99, 348/207.1, 207.11, 207.2, 211.1, 211.2, 211.3, 348/211.4, 211.5, 211.6; 235/375, 462.02, 235/462.09, 462.08, 462.11, 462.24; 725/105; 455/556.1, 41.1, 566; 709/217, 227; 358/1.15; 340/10.51, 10.52, 4.32
    See application file for complete search history.

(56) References Cited

U.S. PATENT DOCUMENTS

| | | | | |
|---|---|---|---|---|
| 6,389,182 B1 * | 5/2002 | Ihara et al. | ...................... | 382/309 |
| 6,501,854 B1 * | 12/2002 | Konishi et al. | ................ | 382/181 |
| 7,076,209 B2 * | 7/2006 | Sugikawa et al. | ............ | 455/41.2 |
| 7,124,953 B2 * | 10/2006 | Anttila et al. | ............ | 235/472.02 |
| 7,188,139 B1 * | 3/2007 | Ayatsuka et al. | ............. | 709/204 |
| 7,221,910 B2 * | 5/2007 | Ishii et al. | ..................... | 455/41.2 |
| 7,240,036 B1 * | 7/2007 | Mamdani et al. | ............... | 705/75 |
| 7,912,426 B2 * | 3/2011 | Masera et al. | ................ | 455/41.2 |
| 7,917,608 B2 * | 3/2011 | Tsunoda et al. | .............. | 709/223 |
| 7,946,491 B2 * | 5/2011 | Burian et al. | ............ | 235/462.07 |
| 7,969,286 B2 * | 6/2011 | Adelbert | ..................... | 340/10.51 |
| 2003/0114176 A1 * | 6/2003 | Phillipps | ...................... | 455/500 |
| 2003/0198383 A1 * | 10/2003 | Yamaguchi et al. | ........... | 382/183 |
| 2005/0031092 A1 * | 2/2005 | Umemura et al. | ......... | 379/88.13 |
| 2005/0041120 A1 * | 2/2005 | Miller | ........................... | 348/239 |
| 2005/0279833 A1 * | 12/2005 | Tanaka | ..................... | 235/462.46 |
| 2006/0079247 A1 * | 4/2006 | Ritter | ......................... | 455/456.1 |
| 2006/0208088 A1 * | 9/2006 | Sekiguchi | ................ | 235/472.02 |
| 2007/0213938 A1 * | 9/2007 | Kai | ................. | 702/19 |

(Continued)

FOREIGN PATENT DOCUMENTS

| | | |
|---|---|---|
| JP | 2003-143457 A | 5/2003 |
| JP | 2006-109296 A | 4/2006 |
| JP | 2007-34443 A | 2/2007 |

OTHER PUBLICATIONS

Japanese Office Action dated Mar. 13, 2012, issued in corresponding Japanese Patent Application No. 2008-053695.

*Primary Examiner* — Aung S Moe (74) *Attorney, Agent, or Firm* — Westerman, Hattori, Daniels & Adrian, LLP (57) ABSTRACT

An image capturing apparatus which performs connection setting to a desired processing apparatus among more than one processing apparatus connected to a network comprises a control unit which instructs each of the processing apparatuses so as to perform identification display for identifying the processing apparatus, and an imaging unit which image the identification displays performed by the processing apparatuses based on the instructions. The control unit specifies the desired processing apparatus to perform connection setting on the basis of data acquired by imaging the identification display by means of the imaging unit.

13 Claims, 7 Drawing Sheets

U.S. PATENT DOCUMENTS

| | | | |
|---|---|---|---|
| 2007/0299728 A1* | 12/2007 | Nemirofsky et al. | 705/14 |
| 2009/0065566 A1* | 3/2009 | Lee et al. | 235/375 |
| 2009/0154759 A1* | 6/2009 | Koskinen et al. | 382/100 |
| 2009/0325640 A1* | 12/2009 | Chava | 455/556.1 |
| 2010/0038417 A1* | 2/2010 | Blankitny | 235/375 |
| 2011/0117940 A1* | 5/2011 | Pfaender et al. | 455/466 |
| 2011/0212751 A1* | 9/2011 | Havens et al. | 455/556.1 |
| 2012/0067945 A1* | 3/2012 | Zsigmond et al. | 235/375 |

\* cited by examiner

| Device | Function | Display form |
|---|---|---|
| 311 | Printer | LCD (240 × 120) |
| 312 | Printer | LCD (240 × 120) |
| 313 | Printer | LCD (240 × 120) |
| 321 | Storage | WINDOW |
| 322 | Storage | WINDOW |
| 331 | Storage | LED |

INFORMATION PROCESSING TERMINAL AND TERMINAL SELECTION SYSTEM

CROSS-REFERENCE TO RELATED APPLICATIONS

This application is based upon and claims the benefit of priority from prior Japanese Patent Application No. 2008-053695, filed Mar. 4, 2008, the entire contents of which are incorporated herein by reference.

BACKGROUND OF THE INVENTION

1. Field of the Invention

The present invention relates to an information processing terminal configured to connect to a network, and a terminal selection system which performs connection setting among information processing terminals.

2. Description of the Related Art

In recent years, an image capturing apparatus, such as a digital camera, configured to connect to a network, such as a LAN, has become widely used. In this kind of the digital camera, connecting the digital camera to the LAN enables image data captured with the digital camera to be printed out by a printer, and to be recorded in a personal computer (PC), etc., connected to the LAN.

Meanwhile, to achieve such a function, it is necessary to perform the connection setting in advance between the digital camera and the printer, PC, etc., connected to the LAN.

That is, it is necessary for a user to research ID information (e.g., IP address, or a name on a network) of desired apparatuses (apparatuses that the user wants to use) in advance to perform setting based on the ID information or to display a screen (e.g., a list display of the apparatuses connected to the LAN) for apparatus selection on a prescribed display apparatus, and select the apparatuses desired by the user with reference to the display to perform the connection setting.

According to the conventional method of the given, in an environment which is usually used by the user, or in a case in which the number of apparatuses connected to the LAN is small, so many demerits in the method do not occur.

For instance, the following technique is disclosed in Jpn. Pat. Appln. KOKAI Publication No. 2006-109296. That is, a digital camera, which comprises a External interface unit for transmitting an identification signal to a printer without passing through a network, a unit for displaying information related to the printer on the basis of storage information received from the printer after connecting to the printer though the network, is disclosed. According to this digital camera, making a list to present only apparatuses which mach with conditions among the apparatuses connected to the network to the user decreases troubles for specifying the apparatuses.

BRIEF SUMMARY OF THE INVENTION

According to a first aspect of the invention, there is provided an information processing terminal which performs connection setting to a desired processing apparatus among one or more processing apparatuses connected to a network, comprising:

an identification display instruction unit which instructs, via the network, each of the processing apparatuses to perform identification displays for identifying each of the processing apparatuses;

an imaging unit which image the identification displays performed by the processing apparatuses based on the instructions from the identification display instruction unit; and a selection unit which specifies the desired processing apparatus on the basis of data obtained by the imaging of the identification displays by the imaging unit to perform connection setting.

According to a second aspect of the invention, there is provided a terminal selection system in which a first information processing terminal connected to a network selects a desired second information processing terminal among more than one second information processing terminal connected to the network to perform connection setting, comprising:

the first information processing terminal comprising:

an identification display instruction unit which instructs each of the second information processing terminals via the network so as to perform an identification display for identifying each of the second information processing terminals;

an imaging unit which image the identification displays performed by the second information processing terminals based on the instructions from the identification display instruction unit; and a selection unit which specifies the desired second information processing terminal to perform connection setting on the basis of data obtained through imaging the identification displays by the imaging unit; and the terminal selection system comprising:

the second information processing terminal, comprising:

an instruction acquisition unit which acquires the instructions from the first information processing terminal via the network; and a display unit which performs the identification displays when the instruction acquisition unit acquires the instructions.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, information processing terminals and terminal selection systems of embodiments of the invention will be described with reference to the drawings.

First Embodiment

The following will describe an information processing terminal and a terminal selection system of a first embodiment of the invention. In the first embodiment, an image capturing apparatus is assumed as the information processing terminal.

Figure 1A:
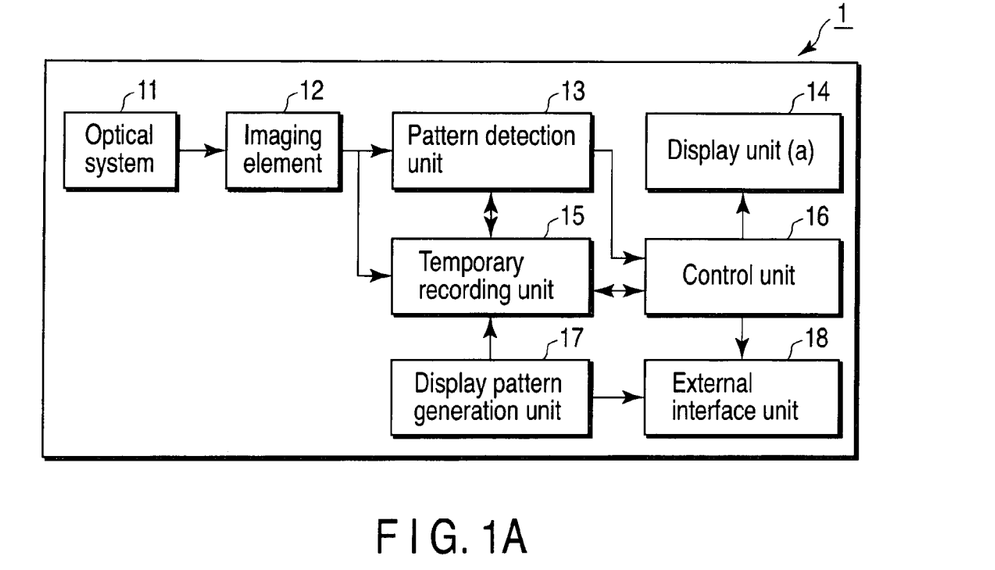
FIG. 1A is an exemplary view depicting a functional system configuration of an image capturing apparatus of a first embodiment of the invention.
Figure 1B:
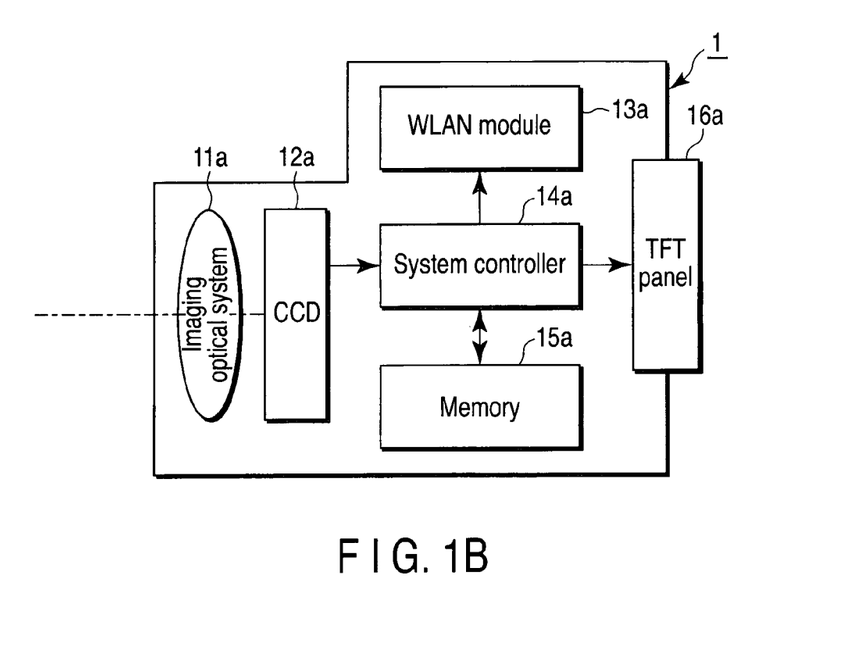
FIG. 1B is an exemplary view depicting a schematic configuration of the image capturing apparatus of the first embodiment of the invention.

FIG. 1A shows a view depicting a functional system configuration of the image capturing apparatus in the first embodiment of the invention. FIG. 1B shows a view depicting a schematic configuration of the image capturing apparatus of the first embodiment. In the first embodiment, the image capturing apparatuses shown in FIGS. 1A and 1B perform connection setting to apparatuses to be set (e.g., PCs and printers) given below via a network.

As shown in FIG. 1A, an image capturing apparatus 1 of the first embodiment comprises an optical system 11, a temporary recording unit 15, a control unit 16, a display pattern generation unit 17 and a External interface unit (a) 18.

The optical system 11 is an optical system which forms an image of a subject on the imaging element 12.

The imaging element 12 converts the image of the subject formed by the optical system 11 into a video signal (an electrical signal).

The External interface unit (a) 18 communicates with the apparatus connected to the network via the network. More specifically, the External interface unit (a) 18 communicates with apparatuses such as PCs and printers, connected to the network via, for example, a wireless LAN.

The display pattern generation unit 17 generates a pattern to be displayed (a display pattern) on a display unit provided for the apparatus to be set which is connected to the network.

The temporary recording unit 15 is a recording unit which records the video signal supplied from the image element 12, the display pattern generated from the display pattern generation unit 17, and an IP address or the like of the apparatus associated with the prescribed display pattern among the apparatuses connected to the network (the apparatuses will be described in detail later).

The detection unit 13 performs check processing (detection processing of the matched display pattern; details will be mentioned later) between the display pattern imaged by the imaging element 12 and the display pattern recorded in the recording unit 15.

The control unit 16 integrally controls the entire of the image capturing apparatus 1. For instance, the control unit 16 controls image processing of the video signal recorded in the recording unit 15, the External interface unit (a) 18, the display pattern generation unit 17, etc.

The display unit (a) 14 displays the video signal recorded in the recording unit 15 and processed by the control unit 16.

Hereinafter, a schematic configuration of the image capturing apparatus of the first embodiment will be described with reference to FIG. 1B.

As shown in FIG. 1B, the image capturing apparatus 1 of the first embodiment comprises an image optical system 11a, a charge-coupled device image sensor (CCD) 12a, a wireless local area network (WLAN) module 13a, a system controller 14a, a memory 15a and a thin-film transistor (TFT) panel 16a.

The following will describe correspondence relationships with the system configuration which has been described by referring to FIG. 1A. The image optical system 11a corresponds to the optical system 11, the CCD 12a corresponds to the imaging element 12, the memory 15a corresponds to the recording unit 15, the WLAN module 13a corresponds to the External interface unit (a) 18, the TFT panel 16a corresponds to the display unit (a) 14, and the system controller 14a each corresponds to the detection unit 13, the control unit 16 and the display pattern generation unit 17.

Figure 2A:
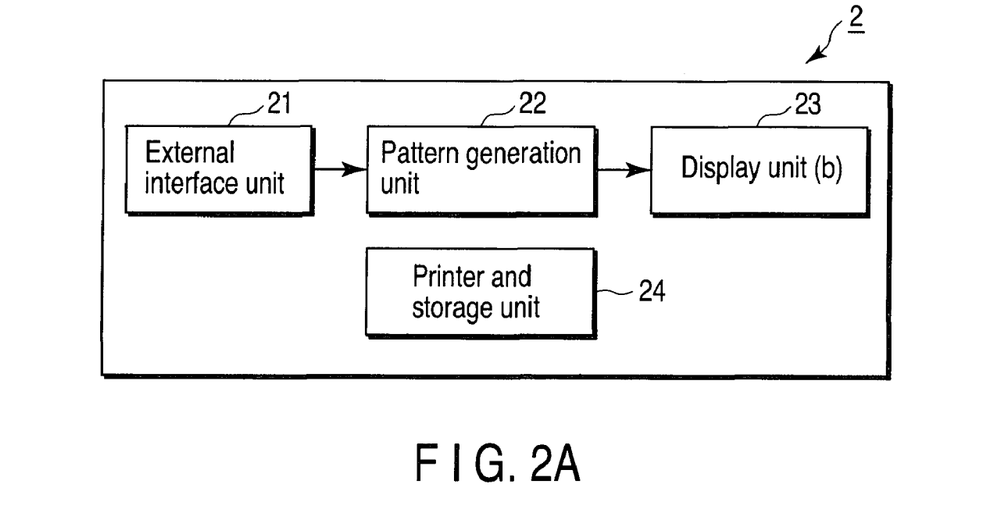
FIG. 2A is an exemplary view depicting a functional system configuration of a apparatus to be set.
Figure 2B:
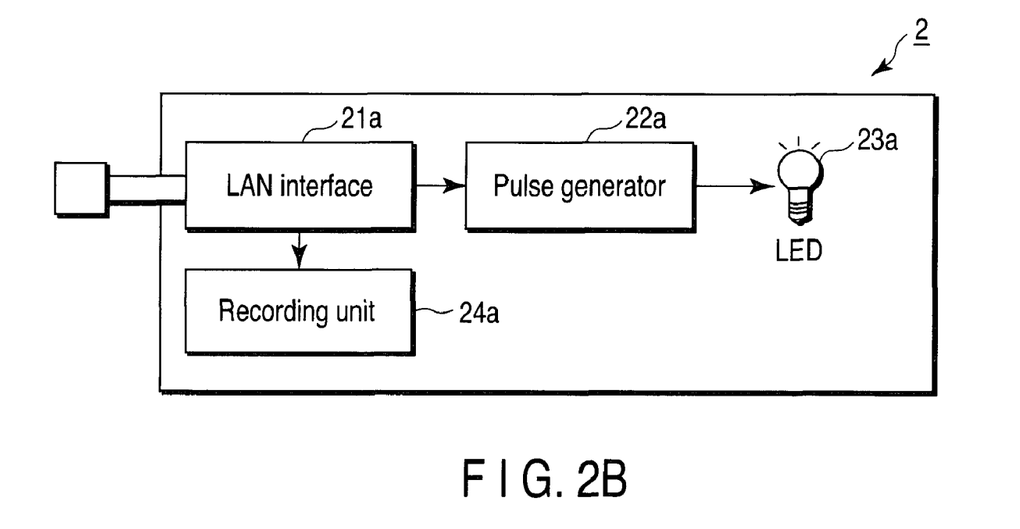
FIG. 2B is an exemplary view depicting a schematic configuration of the apparatus to be set.

FIG. 2A shows a functional system configuration of the apparatus to be set that is the apparatus of the subject to be set by the image capturing apparatus 1. As regards the apparatuses to be set, for example, a printer apparatus and a PC are used. FIG. 2B shows a view depicting a schematic configuration of the apparatus to be set.

As shown in FIG. 2A, the apparatus 2 to be set includes a External interface unit (b) 21, a pattern generation unit 22, a display unit (b) 23, and a printer and storage unit 24.

The External interface unit (b) 21 makes communications with apparatuses connected to a network via the network. More specifically, the External interface unit (b) 21 communicates with the image capturing apparatus 1 connected to the network via, for example, the WLAN.

The pattern generation unit 22 generates display patterns on the basis of the display commands (details will be described later) from the image capturing apparatus 1 received by the External interface unit (b) 21 to output the display patterns to the display unit (b) 23. This display patterns are displayed on the display unit (b) 23.

The printer and storage unit 24 is, for example, a unit for taking on a printer function and a storage function. The functions of the printer and storage unit 24 are not limited to the printer function and the storage function, and of course it is suitable for the unit 24 to further take on various functions desired by a user. That is, the apparatus 2 to be set is not limited to the printer apparatus and the PC, etc., and other apparatuses having other various functions may be used.

The following will describe the schematic configuration of the apparatus 2 to be set.

As shown in FIG. 2B, the apparatus 2 to be set includes a LAN interface 21a, a pulse generator 22a, an LED 23a and a recording unit 24a.

The following will describe correspondence relationships with the functional system configuration by referring to FIG. 2A.

The LAN interface 21a corresponds to the External interface unit (b) 21, the pulse generator 22a corresponds to the pattern generation unit 22, the LED 23a corresponds to the display unit (b) 23, and the recording unit 24a corresponds to the printer and storage unit 24.

The LAN interface 21a is an interface circuit which connects to, for example, Ethernet (registered trademark). The pulse generator 22a generates a pulse pattern which makes the LED 23a emit light on the basis of output information from the LAN interface 21a.

Figure 3:
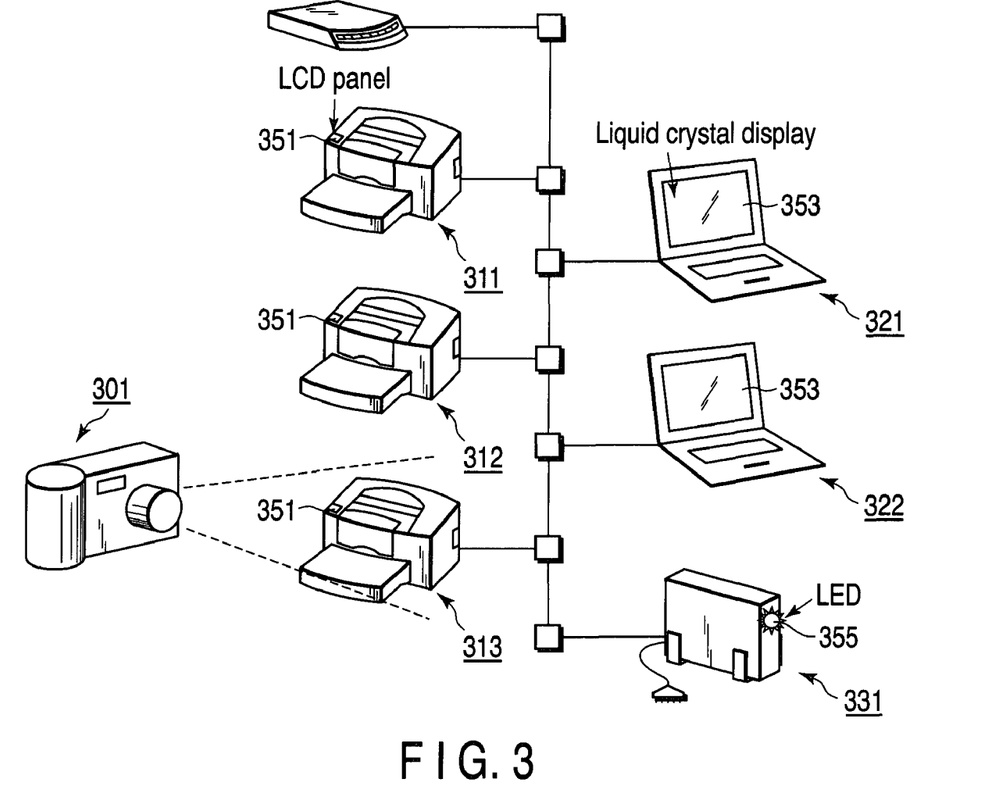
FIG. 3 is an exemplary view depicting an example of a use environment of the image capturing apparatus and the apparatus to be set.

FIG. 3 shows a view depicting an example of use environments of the image capturing apparatus 1 and the apparatus 2 to be set. As shown in FIG. 3, a printer 311, a printer 312, a printer 313, a PC 321, a PC 322 and a hard disk drive 331 are connected to the same local area network via a router 300.

That is, each apparatuses shown in FIG. 3 is connected to the same local area network via the router 300. The camera 301 is wirelessly connected to the local area network configured by the router 300. It is assumed that an IP address has been assigned to each apparatuses shown in FIG. 3.

Here, the camera 301 shown in FIG. 3 corresponds to the image capturing apparatus 1 which has been described by referring to FIGS. 1A and 1B. The printer 311, printer 312, printer 313, PC 321, PC 322 and hard disk drive 331 each correspond to the apparatus 2 to be set which has been described by referring to FIGS. 2A and 2B.

As display apparatuses in order to visually recognize communication establishment via the network, the printers 311, 312, 313 each have an LCD panel 351, the PCs 321, 322 each have a liquid crystal display 353, and the hard disk drive 331 has an LED 355.

In the embodiment, it is assumed that the printer 313 is a apparatus to which connection setting is performed by the camera 301. That is, the image capturing apparatus 1 performs the connection setting to the printer 313 as a print-out destination of the image data captured with the camera 301. The user images the display pattern displayed on the LCD panel 351 provided for the printer 313 so as to set the printer 313 as the print-out destination. The details of the processing of the connection setting will be described later.

Figure 4:
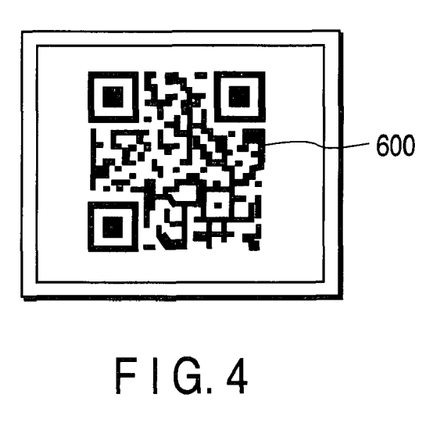
FIG. 4 is an exemplary view depicting a display example of a display pattern on a liquid crystal display (LCD) panel provided for a printer.
Figure 5:
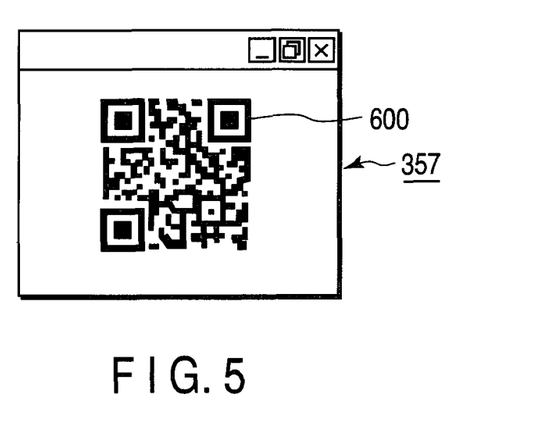
FIG. 5 is an exemplary view depicting a display example of a display pattern displayed on the liquid crystal display provided for a PC when the PC is set as an image data transmission destination from a camera.

FIG. 4 shows a view depicting a display example of the display pattern on the LCD panel 351 provided for the printer 311. FIG. 5 is a view depicting a display example, for example, of the display pattern on the liquid crystal display 353 provided for the PC 321.

While the display examples shown in FIGS. 4 and 5 each have used generic two-dimensional codes 600 as the display patterns, it is sure that the display patterns are not limited to the two-dimensional codes 600.

In the display example shown in FIG. 5, the image capturing apparatus 1 displays a window for connection establishment 357 on the liquid crystal display 353 provided for the PC 321 to display the two-dimensional code 600 that is the display pattern in the window 357.

Figure 6:
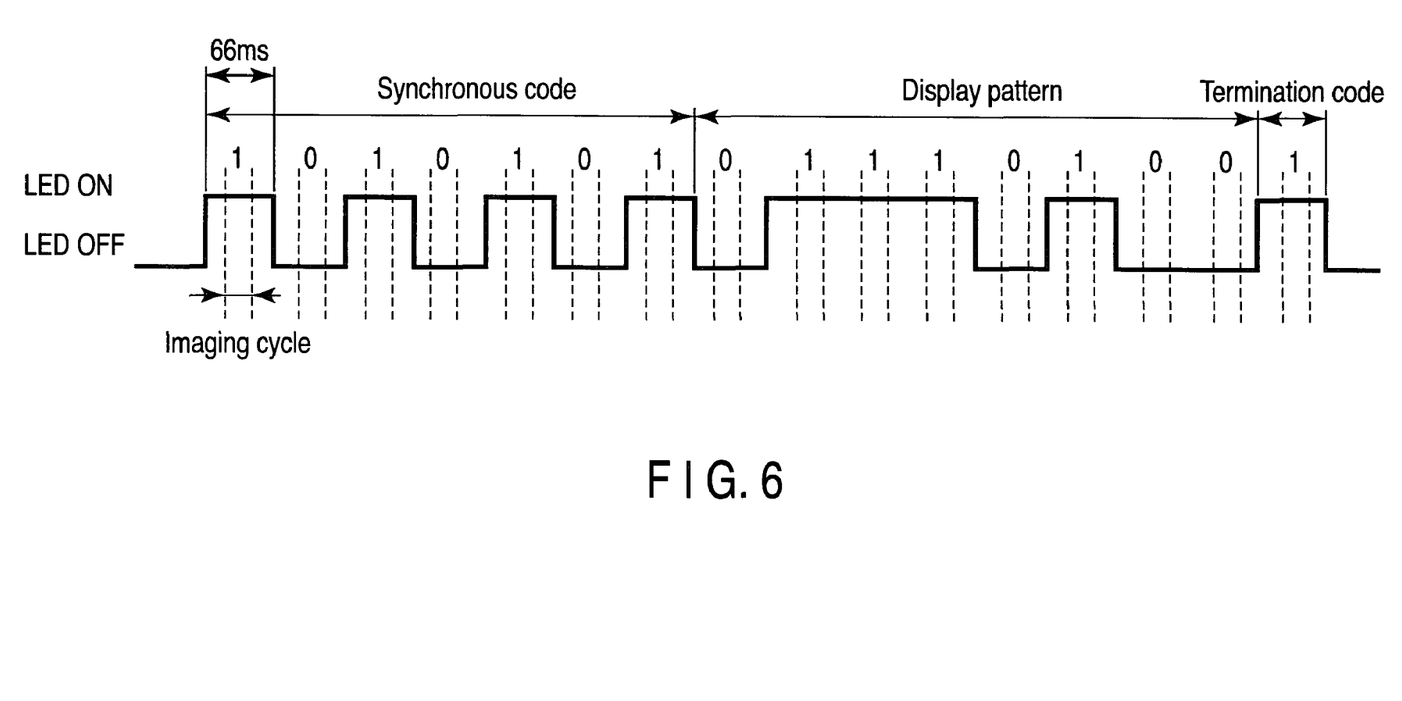
FIG. 6 is an exemplary view depicting an example of a display pattern due to a flashing cycle of a light-emitting diode (LED) provided for a hard disk drive.

FIG. 6 shows an example of the display pattern due to a flashing cycle of the LED 355 provided for the hard disk drive 331. In the example shown in FIG. 6, the LED 355 is made to flash in a 15 Hz cycle, and the LED 355 is displayed in order of a synchronous code, a display pattern and a termination code. When the image capturing apparatus 1 images in a 30 f/s that is moving picture imaging of a generic digital camera, the flashing cycle of 15 Hz is a maximum cycle capable of being sampled.

Figure 8:
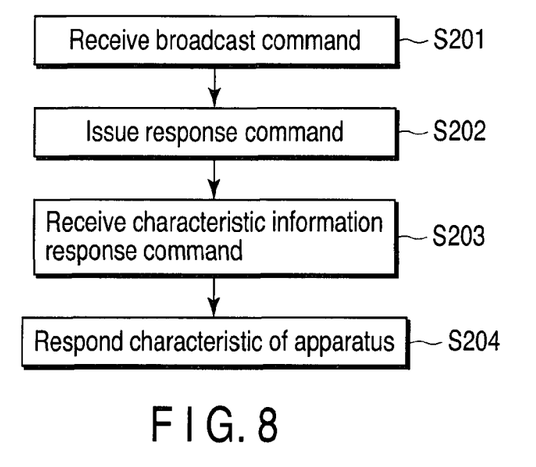
FIG. 8 is an exemplary view depicting a flowchart of response processing of the apparatus to be set for a transmission from the image capturing apparatus.
Figure 9:
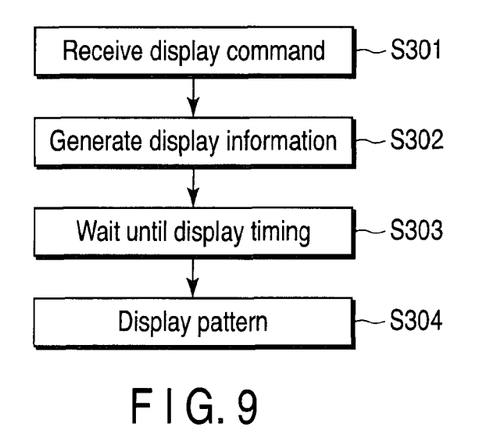
FIG. 9 is an exemplary view depicting a flowchart of operation processing of the apparatus to be set which has received a display command.

Hereinafter, connection setting processing of the first embodiment will be described by referring to flowcharts each shown in FIGS. 7-9.

Figure 7:
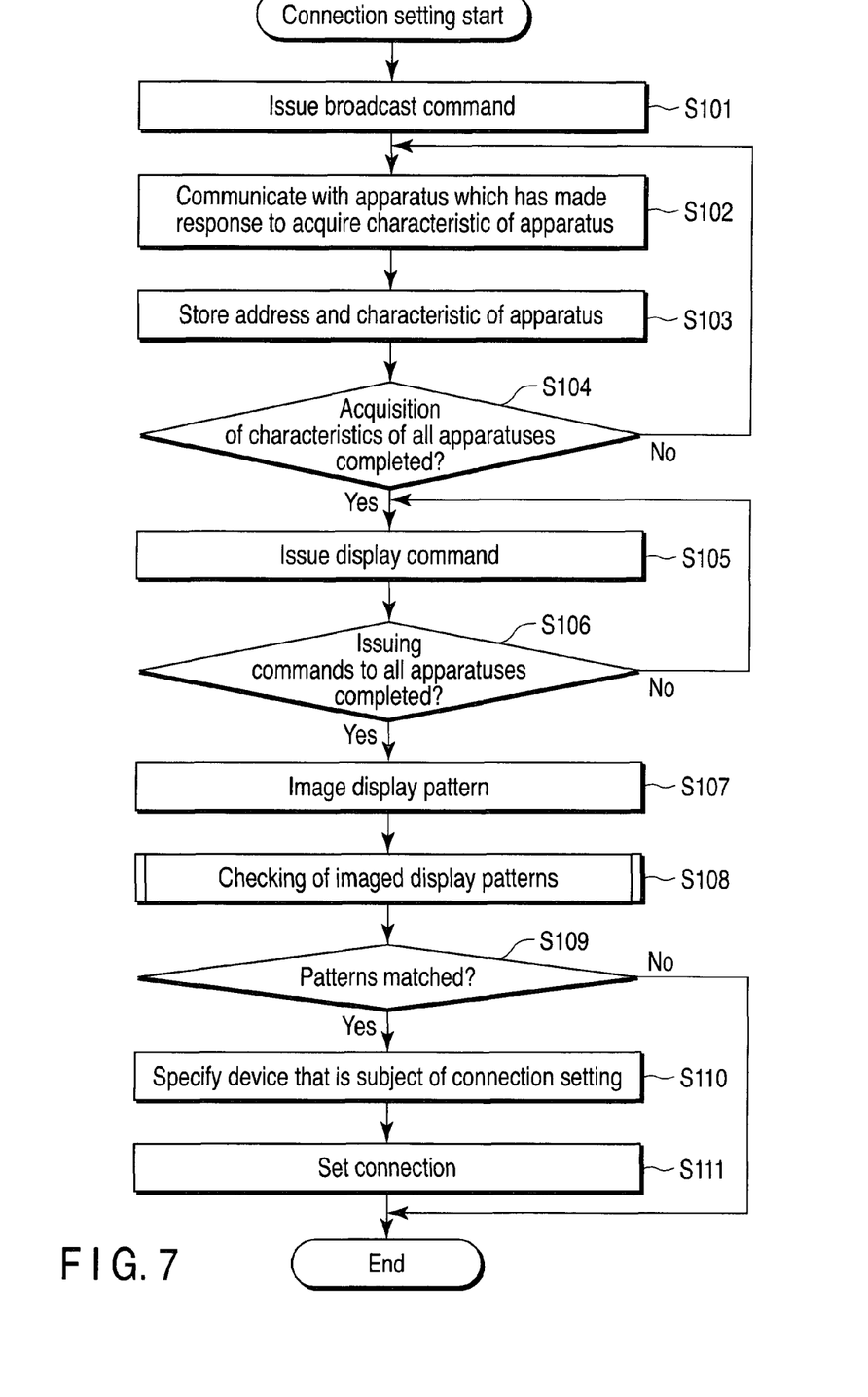
FIG. 7 is an exemplary view depicting a flowchart of control processing by a system controller of the camera.

FIG. 7 shows a flowchart of the control processing by the system controller 14a of the image capturing apparatus 1 (here, the camera 301 shown in FIG. 3 is assumed). FIG. 8 shows a flowchart of the response processing by the apparatuses 2 to be set (here, the printers 311, 312, 313, the PC 321, 322 and the hard disk drive 331 shown in FIG. 3 are assumed) for the transmission from the image capturing apparatus 1. FIG. 9 shows a view depicting the flowchart of operation processing of the apparatuses to be set 2 which have received display commands described later.

At first, when the user switches the camera 301 into a connection setting mode (a mode to set a connection destination), the control unit 16 makes the display unit (a) 14 display a message which prompts the user to image the display apparatus for connection establishment (e.g., the LCD panel 351, the liquid crystal display 353, the LED 355, etc.). When the user who has visually recognized the display images the display apparatus for the connection establishment, the control unit 16 starts the processing of the connection setting.

The camera 301 firstly controls the External interface unit (a) 18 to issue broadcast commands (Step S101).

The broadcast commands issued in Step S101 are received by each External interface unit (b) 21 provided for each of the apparatuses (printers 311, 312, 313, PCs 321, 322, hard disk drive 331) connected to the camera 301 via the network (Step S201).

Further, each of the apparatuses (printers 311, 312, 313, PCs 321, 322, hard disk drive 331) connected to the camera via the network issues a response command including information of an IP address to the camera 301 (Step S202).

The camera 301 then issues a characteristic information response command requiring a response of characteristic information to the apparatus which has issued the response command in Step S202 (Step S102).

Figure 10:
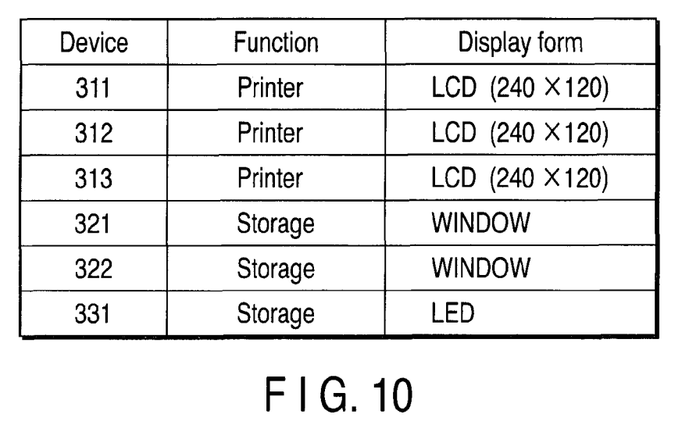
FIG. 10 is an exemplary view depicting an example of characteristic information.

The characteristic information is, as shown in FIG. 10, information showing a function (e.g., a printer function and a storage function) of the apparatus, and a form of the display apparatus for the communication establishment. FIG. 10 shows a view depicting an example of the characteristic information.

When receiving the characteristic information response command (Step 203) issued from the camera 301 in Step S102, each of the apparatuses (printers 311, 312, 313, PCs 321, 322, hard disk drive 331) transmits the characteristic information of the apparatus as a response for the received response command to the camera 301 (Step S204).

The camera 301 which has received the response from each of the apparatuses (printers 311, 312, 313, PCs 321, 322, hard disk drive 331) records the necessary information and the IP addresses among the items of the characteristic information in the temporary recording unit 15 (Step S103).

The camera 301 then determines whether or not the characteristic information has been completely acquired from all sets of each of the apparatuses (printers 311, 312, 313, PCs 321, 322, hard disk drive 331) (Step S104). If Step S104 results in "NO", the camera 301 shifts to Step S102.

Conversely, if Step S104 results in "YES", the camera 301 issues the display command (step S105). Then it is determined whether or not the camera 301 has completely issued the display commands to all the apparatuses which have received the responses in Step S103 (Step S106).

The display commands are commands to make the display unit (e.g., the LCD panel 351, the liquid crystal display 353, the LED 355) provided for each apparatus display the specific display patterns generated from the pattern generation unit 22. The display commands make the display unit display the patterns capable of being displayed in the form of the display apparatuses on the basis of "form of display apparatus" described in the characteristic information acquired in advance for each of the apparatuses.

Display timing information that is information instructing at which timing the display patterns should be displayed is added to the display commands. In this way, adding the display timing information to the display commands enables imaging timing and display timing in Step S107 described later to be matched with each other, and enables preventing missing of imaging of the display patterns.

Of course, information instructing the times continuing the displays of the display patterns, information instructing the number of times of repeated displays of the display patterns, etc., may be added in addition to the display timing information.

By the way, when receiving the display commands from the External interface unit (b) 21 (step S301), each of the apparatuses (printers 311, 312, 313, PCs 321, 322, hard disk drive 331) acquires the prescribed display pattern generated from the pattern generation unit 22 and the display timing information, and also generates display information that is data to be actually displayed on the basis of the acquired information (Step S302).

Further, each of the apparatuses (printers 311, 312, 313, PCs 321, 322, hard disk drive 331) waits until the prescribed display timing on the basis of the display information (Step S303), and when the prescribed display timing reaches, outputs to display the display patterns on the display unit (b) 23 (the LCD panel 351, the liquid crystal display 353, the LED 355) (Step S304).

Specifically, if each of the apparatuses is, for example, the printers 311, 312, 313, the apparatuses each perform the display shown in FIG. 4 on the LCD panel 351, if each of the apparatuses is PC 321, 322, the apparatuses each perform the display shown in FIG. 5 on the liquid crystal display 353, and if each of the apparatus is the hard disk drive 331, the apparatus perform the display by the LED flashing pattern shown in FIG. 6 on the LED 355.

If Step S106 results in "YES", the user uses the camera 301 to image the display patterns displayed on the LCD panel 351 provided for the apparatus (the printer 313 in the embodiment) desired to be set (Step S107).

The camera 301 extracts the display pattern from the video signal captured through imaging in Step S107 by means of the pattern detection unit 13 to check the extracted display pattern with the display patterns pre-recorded in the temporary recording unit 15 (Step S108).

The camera 301 determines whether or not the matching of the display patterns has been detected through the checking in Step S108 (Step S109). If Step S109 results in "NO", the camera 301 determines that the connection setting is failed and ends the processing of the connection setting.

Conversely, if Step S109 results in "YES", the camera 301 associates the IP addresses and the functions on the network recorded on the recording unit 15 with the matched display pattern to read the IP address and the function, and specifies the apparatus (the printer 313 in the embodiment as given above) that is the subject of the connection setting (Step S110).

The camera 301 assigns the IP address on the network read in Step S110 to the apparatus (the printer 313 in the embodiment as given above) specified in Step S110 to perform the connection setting (Step S111). For example, if the apparatuses specified in Step S110 is a printer, the camera 301 sets the apparatus as a print destination. If the apparatus which has been specified in Step S110 is the printer, the camera 301 performs the connection setting to the apparatus as a storage destination.

As mentioned above, according to the first embodiment, an information processing terminal and a terminal selection system configured to easily operate the setting among apparatuses on a network can be provided without disposing an exclusive interface and without using the existing interface.

Specifically, performing the processing described with reference to flowcharts shown FIGS. 7-9, enables the user of the camera 301 to perform the connection setting between the camera 301 and the printer 313 through a simple operation for transmitting the image data, for example, from the camera 301 to the printer 313. More specifically, the user of the camera 301 can perform the connection setting between the camera 301 and the printer 313 without taking a great deal of time such as processing to select the printer 313 from among many apparatuses connected to the network even if the user doses not know the IP address or the name of the printer 313 on the network.

Further, using a QR code, etc., as the display pattern enables the user to use the existing recognition system.

Second Embodiment

The following will describe an information processing terminal and a terminal selection system of a second embodiment of the invention. The description overlapping with that of the first embodiment will be eliminated.

As regards one of main difference points between the first and the second embodiments, the image capturing apparatus 1 (the camera 301) is not provided with the display pattern generation unit 17 in the second embodiment.

That is, in the second embodiment, for issuing display commands (Step S105), the camera 301 does not generate the display patterns and only performs instructions of the display patterns.

When receiving the display commands issued in Step S105 (Step S301), each of the apparatuses (printers 311, 312, 313, PCs 321, 322, hard disk drive 331) converts the IP address on the network assigned to itself into a two-dimensional code (Step S302).

Moreover, each of the apparatuses (printers 311, 312, 313, PCs 321, 322, hard disk drive 331) waits until prescribed display timing on the basis of the display information (Step S303), and when the prescribed display timing arrives, outputs to display the two-dimensional code on the display unit (b) 23 (the LCD panel 351, the liquid crystal display 353, the LED 355) (Step S304).

If the display unit is an LED in a similar manner of the hard disk drive 331 shown in FIG. 3, the camera 301 generates a prescribed light emission pattern in Step S302. As regards a method for generating the light emission pattern, for example, a method for digitizing to display a fourth address number among four numerical figures of the IP address is a possible approach.

The user uses the camera 301 to image the two-dimensional code displayed on the display apparatus (the LCD panel 351 in the embodiment) provided for the apparatus (the printer 313 in the embodiment) of which the connection setting is desired. The camera 301 decodes the two-dimensional code imaged with the camera 301, and retrieves to specify the apparatus matching with the IP address recorded in the recording unit 15, based on the information acquired though the decoding (Step S110).

In the second embodiment, the camera 301 may concurrently issue the display commands in Step S105 in a multicast system.

As mentioned above, according to the second embodiment, the information processing terminal and the terminal selection system which produces an effect on no influence even if other apparatuses have been already performed their connection setting because the use of the IP addresses as the display patterns as well as produces the same effects as those of the information processing terminal and the terminal selection system of the first embodiment.

More specifically, when receiving the display command transmitted from the image capturing apparatus 1, each of the apparatuses 2 to be set connected to the network generates the display pattern on the basis of its own IP address. Performing such a process enables the image capturing apparatus 1 (the camera 301) in Step S105 to issue the display commands in the multicast system. That is, the processing time taken for performing the connection setting can be shortened.

Third Embodiment

Hereinafter, an information processing terminal and a terminal selection system of a third embodiment of the invention will be described. The description overlapping with that of the first embodiment will be eliminated.

One of main difference points between the first and the third embodiments is a point differing in control processing by the system controller 14*a* of the image capturing apparatus 1 (here, the camera 301 shown in FIG. 3 is assumed in a similar manner to that of the first embodiment). Hereinafter, the processing will be described by referring to a flowchart shown in FIG. 11.

Figure 11:
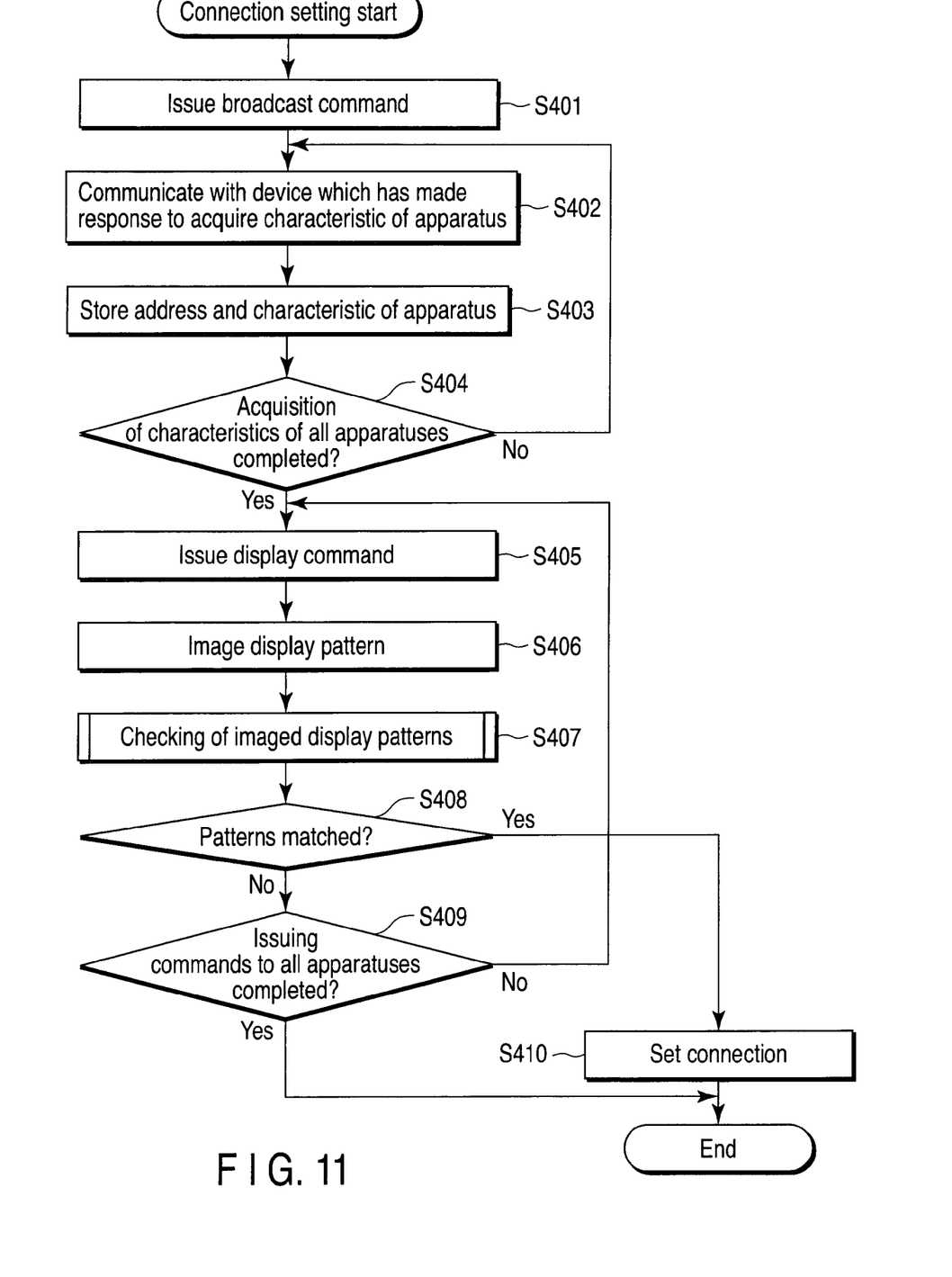
FIG. 11 is an exemplary view depicting a flowchart of control processing by a system controller of a camera of a third embodiment of the invention.

When the user switches the camera 301 into a connection setting mode (a mode for setting a connection destination), the control unit 16 makes the display unit (a) 14 display a message which prompts the user image a display apparatus for connection establishment (e.g., the LCD panel 351, the liquid crystal display 353, the LED 355). When the display apparatus for the connection establishment is imaged by the user who has visually recognized the display, the control unit 16 starts the processing of the connection setting.

The camera 301 firstly issues the broadcast command by means of the External interface unit (a) 18 to each of the apparatuses (printers 311, 312, 313, PCs 321, 322, hard disk drive 331) connected to the camera 301 via the network (Step S401).

Meanwhile, each of the apparatuses (printers 311, 312, 313, PCs 321, 322, hard disk drive 331) connected to the camera 301 via the network performs the processing in Steps S201-S204 in the same way as that of the first embodiment.

The camera 301, which has received the response from each of the apparatuses (printers 311, 312, 313, PCs 321, 322, hard disk drive 331) in Step S204, records the necessary information among the items of the character information and the IP address in the temporary recording unit 15 in a similar manner in the first embodiment (Steps 402, 403).

The camera 301 then determines whether or not the camera 301 has completely acquired each items of the characteristic information from all of each of the apparatuses (printers 311, 312, 313, PCs 321, 322, hard disk drive 331) on the network (Step S404). In a case of branching Step S404 results in "NO", the camera 301 shifts to Step S402.

Conversely, in a case of branching Step S404 results in "YES", the camera 301 issues the display commands (Step S405). In the second embodiment, although the camera 301 issues the display commands in order of registration for each of the apparatuses, the camera 301 does not issue the display commands for the apparatuses not corresponding to the conditions in a case in which the user has selected the connection setting, in advance, to the apparatuses having the prescribed functions (e.g., a case in which the connection setting of the printer, or the connection setting of the hard disk drive has been performed).

After completing the processing in Step S405, the user uses the camera 301 to image the display patterns displayed on the LCD panel 351 provided for the apparatus (the printer 313 in the embodiment as given above) desired its connection setting to the network (Step S406).

The camera 301 extracts the display patterns from the video signals captured through the imaging in Step S406, and checks among the display patterns captured by the extraction with the display patterns transmitted in Step S405 (Step S407).

It is determined whether or not the matching among the display patterns has been detected in the checking processing in Step S407 (Step S408). If Step S408 results in "YES", the camera 301 reads the IP addresses on the network and the functions recorded in the recording unit 15 by associating read information with the matched display patterns, and specifies the apparatus (the printer 313 in the embodiment as mentioned above) of the subject to which connection setting is performed to perform the connection setting (Step S410).

Conversely, if Step S408 results in "NO", the camera 301 determines whether or not the camera has completely issued the display commands to all the apparatuses to which the responses have been received in Step S403 (Step S409). If Step S409 results in "NO", the camera 301 shifts to Step S405. Conversely, if Step S409 results in "YES", the camera 301 recognizes that the connection setting has resulted in a failure to end the processing of the connection setting.

In the issuing processing of the display commands in Step S405, the display data may be transmitted in a time division manner for each apparatus to be set, and the display command may be transmitted to the apparatuses to be set which have not transmitted the display commands yet with elapse of a predetermined time after the apparatuses to be set receives to display the display commands.

The following will specifically describe a concept of a flow of connection setting processing in the third embodiment. In the same way as that of the foregoing embodiment, also in the example, it is assumed that the printer 313 is set as the data output destination from the camera 301.

The camera 301 firstly recognizes the existence of the printers 311, 312, 313 as printers on the network. The camera 301 then performs the processing from Step S405 to Step S407 for the printer 311; however, the camera 301 cannot recognize the matching of the display patterns through the processing in Step S108. The camera 301 performs the processing from Step S405 to Step S407 for the printers 312, 313; however, the camera 301 cannot recognize the matching of the display patterns through the processing in Step S408. The camera 301 then performs the processing from Step S405 to Step S407 for the printer 313 to recognize the matching of the display patterns through the processing in Step S408. Based on this series of the processing, the camera 301 specifies the printer 313 as the apparatus to be set as the print-out destination and also performs the connection setting.

As given above, according to the third embodiment, the information processing terminal and the terminal selection system configured to reduce the number of the display patterns to be generated and make the display patterns simple because the information processing terminal and the terminal selection system of the third embodiment produce the same effects as those of the first embodiment and also issue the display commands in turn to the apparatuses on the network. Further, in the third embodiment, since the processing is performed by excluding the apparatuses having no desired function from the subject of the connection setting in advance on the basis of the functions desired for the connection setting destinations, the processing time required for the connection setting can be reduced.

While the invention has been described on the basis of the first to the third embodiments, the invention is not limited to the specific details and representative embodiments shown and described herein, and various types of the invention can be formed without departing from the spirit or scope of the general inventive concept thereof.

For instance, while the camera 301 is assumed as the image capturing apparatus 1, the image capturing apparatus is not limited to a camera; as long as it has necessary constituent elements like the image capturing apparatus 1, another apparatus can be used. Meanwhile, as regards the apparatus 2 to be set, an image capturing apparatus such as a camera can be used.

The image capturing apparatus 1 may be provided with a unit for detecting display patterns transmitted from other apparatuses other than the image capturing apparatus 1 by referring to communication data on the network, and may be configured to generate display patters differing from the display patterns transmitted from other apparatuses other than the image capturing apparatus 1.

Further, the aforementioned embodiments include inventions in various stages, and various types inventions can be extracted by appropriately combining a plurality of constituent elements disclosed in the foregoing embodiments. Even if some of the elements, for example, may be omitted from the whole of the constituent elements shown in the embodiments mentioned above, in a case in which the problems described in a section of problems to be solved by the invention are solved, and the effects described in a section of effects of the invention are produced, the configuration from which some of the constituent elements are omitted may be also extracted as an invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing terminal which performs connection setting to a desired processing apparatus among one or more processing apparatuses connected to a network, comprising:
an identification display instruction unit which instructs, via the network, each of the processing apparatuses to perform identification displays for identifying each of the processing apparatuses;
an imaging unit which image the identification displays performed by the processing apparatuses based on the instructions from the identification display instruction unit; and
a selection unit which specifies the desired processing apparatus on the basis of data obtained by the imaging of the identification displays by the imaging unit to perform connection setting.

2. The terminal according to claim 1, further comprising:
an identification display generation unit which generates identification display data for the identification display performed by each of the processing apparatuses; and
an association unit which associates the identification display data with the identification display corresponding to each of the identification display data, wherein the selection unit selects the processing apparatus corresponding to the identification display data associated with the identification displays imaged by the imaging unit to perform the connection setting.

3. The terminal according to claim 2, wherein:
when performing the instruction,
the identification display instruction unit transmits the identification display data generated from the identification display generation unit to each of the processing apparatuses.

4. The terminal according to claim 3, wherein:
when a prescribed time passes after transmitting
the identification display data in a time division manner for each processing apparatus, and also after elapse of a prescribed time from the processing apparatus, which transmitted the identification display data, has performed the identification display,
the identification display instruction unit transmits the identification display data to processing apparatuses which have not transmitted the identification display data yet.

5. The terminal according to claim 2, further comprising:
an acquisition unit which acquires the identification display data from each of the processing apparatuses, wherein
the association unit associates at least one of the identification display data among the identification display data generated from the identification display generation unit and the identification display data acquired from the acquisition unit with the identification display corresponding to each of the identification display data.

6. The terminal according to claim 5, further comprising:
a display function information acquisition unit which acquires display function information, showing a display function of a display unit included by each of the processing apparatuses, from each of the processing apparatuses via the prescribed network, wherein
the identification display generation unit generates identification display data corresponding to each of the processing apparatuses on the basis of the display function information acquired by means of the display function acquisition unit.

7. The terminal according to claim 6, wherein
the identification display generation unit refers to the display function information acquired by means of the display function information acquisition unit to generate only identification display data to be transmitted to processing apparatuses each provided with prescribed display functions.

8. The terminal according to claim 5, wherein
the identification display generation unit generates the identification display data so that all the processing apparatuses perform identification displays differing from one another.

9. The terminal according to claim 5, wherein
the identification display generation unit generates the identification display data on the basis of address information on the network of each of the processing apparatuses.

10. The terminal according to claim 5, further comprising:
a detection unit which detects the identification display data transmitted from equipment other than the information processing terminal from communication data on the network, wherein
the identification display generation unit generates the identification display data which differs from the identification display data detected by the detection unit.

11. The terminal according to claim 1, wherein
the identification display instruction unit specifies at least any one of timing so that the processing apparatuses starts an identification display, a time so that the processing apparatus continues the identification display and the number of times so that the processing apparatus repeats the identification display and performs the instruction.

12. The terminal according to claim 1, wherein
the identification display is at least any one of a flushing pattern of light, a prescribed video, and a two-dimensional code.

13. A terminal selection system in which a first information processing terminal connected to a network selects a desired second information processing terminal among more than one second information processing terminal connected to the network to perform connection setting, comprising:
the first information processing terminal comprising:
an identification display instruction unit which instructs each of the second information processing terminals via the network so as to perform an identification display for identifying each of the second information processing terminals;
an imaging unit which image the identification displays performed by the second information processing terminals based on the instructions from the identification display instruction unit; and
a selection unit which specifies the desired second information processing terminal to perform connection setting on the basis of data obtained through imaging the identification displays by the imaging unit; and the terminal selection system comprising:
the second information processing terminal, comprising:
an instruction acquisition unit which acquires the instructions from the first information processing terminal via the network; and
a display unit which performs the identification displays when the instruction acquisition unit acquires the instructions.

* * * * *